Dec. 25, 1956  D. M. SCHWARTZ ET AL  2,775,138
POWER TRANSMISSION FOR MATERIAL HANDLING MACHINES
Original Filed Oct. 24, 1950  3 Sheets-Sheet 1

INVENTOR
DANIEL M. SCHWARTZ &
THEODORE N. HACKETT

BY Stowell + Evans

ATTORNEYS

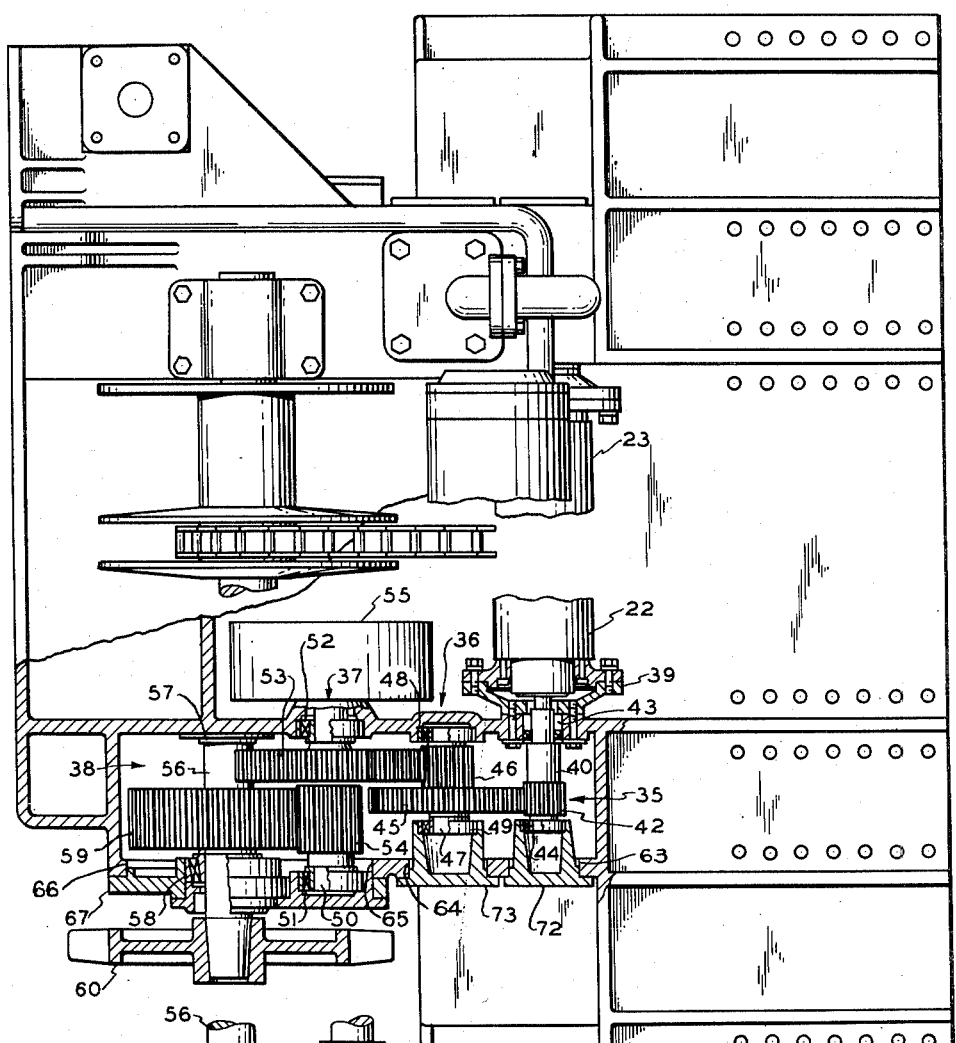

United States Patent Office 2,775,138
Patented Dec. 25, 1956

2,775,138

POWER TRANSMISSION FOR MATERIAL HANDLING MACHINES

Daniel M. Schwartz and Theodore N. Hackett, Salt Lake City, Utah, assignors to The Eimco Corporation, Salt Lake City, Utah, a corporation of Utah Original application October 24, 1950, Serial No. 191,808. Divided and this application December 14, 1951, Serial No. 261,835

3 Claims. (Cl. 74—606)

This invention relates to power transmitting means and in particular to a power transmitting gear train.

It is a principal object of the invention to provide a gear drive mechanism of economical construction in that while maintaining oil-tightness and accuracy of the assembly, it allows line boring of the gear case for each drive unit of the gear train.

In general, the invention comprises in combination with a power transmitting gear train, including a drive shaft and a driven shaft, interconnecting gear means on the shafts; a gear housing having integral bottom, top and end walls, bearing means provided on a wall of the housing for supporting one end of the shafts, openings in the opposite wall corresponding to the bearing means, removable covers over said openings secured to said opposite wall, and means for rotatably supporting the other end of the shafts on said covers.

This application is a division of application Serial No. 191,808, filed October 24, 1950. Related subject matter is disclosed and claimed in the following applications: Serial No. 261,834, filed December 14, 1951; Serial No. 230,365, filed June 7, 1951; Serial No. 228,082, filed May 24, 1951; Serial No. 191,807, filed October 24, 1950.

The invention will be more particularly described with reference to the accompanying drawings, in which:

Fig. 3 is a plan view of the structure shown in Fig. 1 with a portion broken away substantially on line 3—3 of Fig. 1 showing structural details of the crawler gear train; and Fig. 4 is a fragmentary view substantially on line 4—4 of a portion of Fig. 1 showing structural details of the crawler drive.

Figure 1:
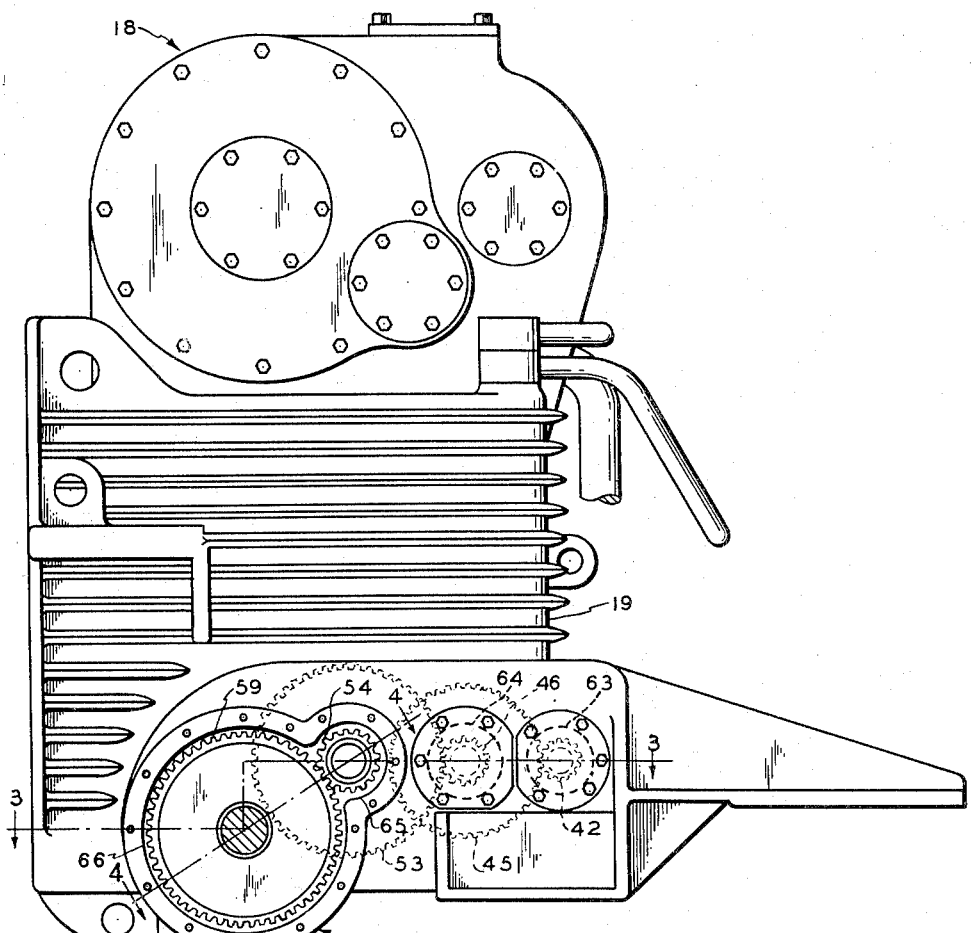
Fig. 1 is a side elevational view of a fluid pressure reservoir embodying one form of the power transmission of the invention.
Figure 2:
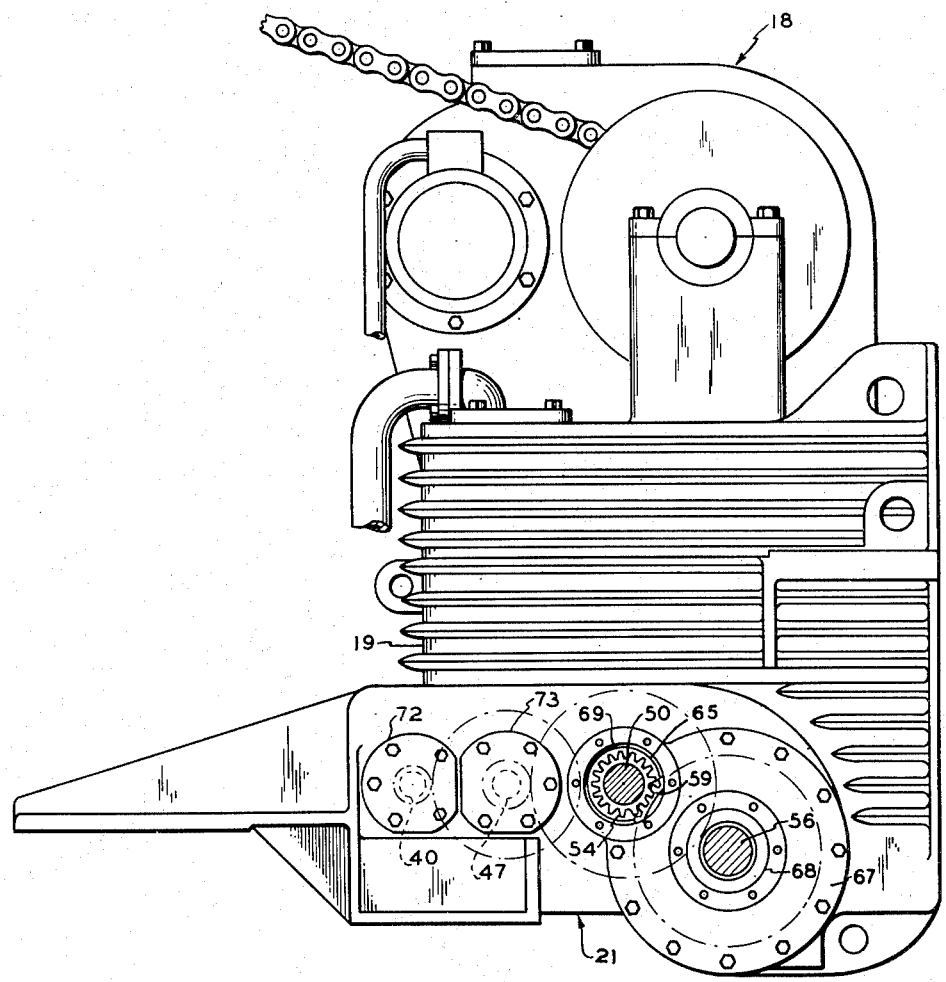
Fig. 2 is the other side of the structure shown in Fig. 1.

With reference to the drawings, drive units 20 and 21 are positioned on each side of a cast hydraulic reservoir 19. Each drive unit is adapted to drive an endless chain type crawler not shown in the drawings, and has an independent fluid pressure operated motor, 22 and 23, and an independent gear train.

Each crawler gear train comprises a motor driven pinion assembly 35, a first intermediate gear assembly 36, a second intermediate gear assembly 37, and a sprocket shaft assembly 38.

Motor driven pinion assembly 35 comprises crawler drive motor mount 39, motor drive shaft 41, pinion shaft 40, gear 42, and inboard and outboard bearings 43 and 44.

The first intermediate gear assembly 36 comprises gears 45 and 46, shaft 47, and inboard and outboard bearings 48 and 49.

Shaft 50 of the second intermediate assembly 37 rotates in bearings 51 and 52 and is provided with gears 53 and 54, and a brake drum 55.

Sprocket shaft assembly 38 comprises shaft 56, housed in bearings 57 and 58, gear 59 and sprocket 60 the teeth of which engage the under side of the endless crawler chain or track.

Thus the crawler motor drives the endless track 61 through gear assemblies 42, 45, 46, 53, 54, 59, and sprocket 60. An identical gear train provided on the other side of the hydraulic reservoir 19 drives the other endless crawler track.

In order to facilitate assemblage of the crawler drive mechanism, to simplify repairs and construction, and to provide an oil tight seal and means to compensate for wear of the bearings, each drive unit is assembled from its side of the reservoir 19. This is accomplished by providing each gear assembly of the gear train with its own bore. These bores are designated 63, 64, 65 and 66 for gear assemblies 35, 36, 37 and 38, respectively. All gear assemblies except the motor pinion assembly 35 are placed in their respective bores through bore 66. Motor pinion assembly is placed through bore 63. As more clearly shown in Fig. 1 of the drawings bore 66 intersects the bore 65 of the second intermediate shaft assembly 37 in order to allow insertion of gears 59, 53 and 45 without the necessity of a split gear housing. A single cover plate 67, provided with bearing clearance holes 68 and 69 for bearing 58 and 51, fits accurately in bore 66 to provide accurate alignment of the bearings of gear assembly 38. This cover plate 67 provides an effective oil seal for both bores 65 and 66 and is bolted on the peripheral surface of the two bores, a surface which is in one plane and machined in one operation. Bearing cover plate 70 is secured to clearance hole 68 in cover plate 67. Bearing cover plate 71 also bolts onto cover plate 67; however, the bore 69 in cover plate 67 is larger than the bore 65 in the crawler drive housing, thus bearing plate 71 fits loosely in bore 69 but snugly in bore 65 and the gear center of the second intermediate assembly 37 is accurately located and held. Bearing cover plates 72 and 73 for shafts 40 and 47 are independent and are secured to bores 63 and 64. It will be seen that this assembly is of a very economical construction, in that, while maintaining accuracy and oil-tightness, it allows line boring of the gear case for each shaft assembly.

From the foregoing description it will be seen that the invention provides an improved power transmission device whereby the aims, objects and advantages are fully accomplished.

We claim:

1. A power transmitting mechanism including two shafts on fixed centers, a housing for said shafts, intersecting openings in a wall of said housing corresponding to each of the shaft centers, each of the openings being concentric with its corresponding shaft, a removable cover for said openings, said cover adapted to fit snugly in one of the intersecting openings in the wall, bearing means supported by said cover for one end of the shaft corresponding to said one of the intersecting openings, second bearing means for one end of the shaft corresponding to the other of said intersecting openings, a support for said second bearing means adapted to fit snugly in the said other of said intersecting openings, and means supporting the other ends of each of said shafts.

2. A power transmitting mechanism including two shafts on fixed centers, a housing for said shafts, bearing means provided on a wall of the housing supporting one end of each of the shafts, intersecting openings in the opposite wall corresponding to the bearing means, each of said openings in said opposite wall being concentric with its corresponding shaft, a removable cover plate over said intersecting openings secured to said opposite wall, said removable cover plate adapted to snugly fit one of said openings in said opposite wall, openings in said cover plate corresponding to the bearing means, one of said openings in said cover plate corresponding to the other of said openings in said opposite wall being larger than said other of said openings in the opposite wall, and means for rotatably supporting the other end of each of the shafts secured to the cover plate openings.

3. A power transmitting mechanism including a first shaft and a second shaft on fixed centers, a housing for said shafts, bearing means provided on a wall of the housing supporting one end of each of the shafts, intersecting openings in the opposite wall corresponding to and concentric with each of the shafts, a removable cover plate over said intersecting openings and secured to said opposite wall, said removable cover plate adapted to fit snugly the opening in said opposite wall corresponding to the first shaft, means supporting the other end of said first shaft in said cover plate, an opening in said cover plate corresponding to and larger than the remaining opening in said opposite wall, and cover means securable to said cover plate for supporting the other end of said second shaft in said remaining opening in said opposite wall.

References Cited in the file of this patent

UNITED STATES PATENTS

| | | |
|---|---|---|
| 695,562 | Keating | Mar. 18, 1902 |
| 1,143,617 | Ehrlich | June 22, 1915 |

FOREIGN PATENTS

| | | |
|---|---|---|
| 69,450 | Sweden | Nov. 5, 1928 |
| 740,132 | France | Nov. 12, 1932 |